United States Patent
Wang et al.

(10) Patent No.: US 8,008,919 B2
(45) Date of Patent: Aug. 30, 2011

(54) METHOD FOR COMPENSATING DRILL PIPE AND NEAR-BOREHOLE EFFECT ON AND ELECTRONIC NOISE IN TRANSIENT RESISTIVITY MEASUREMENTS

(75) Inventors: Tsili Wang, Katy, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 253 days.

(21) Appl. No.: 12/402,592

(22) Filed: Mar. 12, 2009

(65) Prior Publication Data

US 2009/0243618 A1    Oct. 1, 2009

Related U.S. Application Data

(60) Provisional application No. 61/039,360, filed on Mar. 25, 2008.

(51) Int. Cl.
*G01V 3/08* (2006.01)
*G01V 3/00* (2006.01)

(52) U.S. Cl. ........................................ 324/346; 324/338

(58) Field of Classification Search .......... 324/332–335, 324/337–339, 343–346; 175/45, 50; 702/6–7
See application file for complete search history.

(56) References Cited

U.S. PATENT DOCUMENTS

| | | | |
|---|---|---|---|
| 4,659,992 A | 4/1987 | Clark et al. |
| 4,968,940 A | 11/1990 | Clark et al. |
| 5,329,235 A | 7/1994 | Zhou et al. |
| 5,339,036 A | 8/1994 | Clark et al. |
| 5,452,761 A | 9/1995 | Beard et al. |
| 5,453,693 A | 9/1995 | Sinclair et al. |
| 5,469,062 A | 11/1995 | Meyer, Jr. |
| 5,530,358 A | 6/1996 | Wisler et al. |
| RE35,386 E | 12/1996 | Wu et al. |
| 5,892,361 A | 4/1999 | Meyer, Jr. et al. |
| 5,955,884 A | 9/1999 | Payton et al. |
| 6,163,155 A | 12/2000 | Bittar |
| 6,218,842 B1 | 4/2001 | Bittar et al. |
| 6,509,738 B1 | 1/2003 | Minerbo et al. |
| 6,646,441 B2 | 11/2003 | Thompson et al. |
| 6,703,837 B1 | 3/2004 | Wisler et al. |
| 6,819,110 B2 | 11/2004 | Omeragic et al. |
| 6,906,521 B2 | 6/2005 | Tabarovsky |
| 7,046,009 B2 | 5/2006 | Itskovich |
| 7,150,316 B2 | 12/2006 | Itskovich |
| 7,167,006 B2 | 1/2007 | Itskovich |
| 7,202,671 B2 | 4/2007 | Strack et al. |
| 2003/0229449 A1 | 12/2003 | Merchant et al. |
| 2009/0237084 A1* | 9/2009 | Itskovich et al. ............. 324/339 |

OTHER PUBLICATIONS

W. H. Meyer; "Multi-Parameter Propagation Resistivity Interpretation," SPWLA 38th Annual Logging Symposium, Jun. 15-18, 1997, Paper GG, pp. 1-14.

* cited by examiner

*Primary Examiner* — Bot L LeDynh
(74) *Attorney, Agent, or Firm* — Mossman Kumar & Tyler PC

(57) ABSTRACT

Transient measurements made at two spaced apart receivers responsive to separate activation of two transmitters symmetrically disposed about the two receivers. The transmitters and receivers are on an instrument having a conductive body induces currents in the earth formation. The effect of the conductive body is removed by using deconvolving the signal at one receiver using the measured signal at the other receiver. The symmetric transmitter configuration also enables compensation for receiver differences.

14 Claims, 3 Drawing Sheets

METHOD FOR COMPENSATING DRILL PIPE AND NEAR-BOREHOLE EFFECT ON AND ELECTRONIC NOISE IN TRANSIENT RESISTIVITY MEASUREMENTS

CROSS-REFERENCES TO RELATED APPLICATIONS

This application claims priority from U.S. Provisional Patent Application Ser. No. 61/039,360 filed on 25 Mar. 2008.

BACKGROUND OF THE DISCLOSURE

1. Field of the Disclosure

The present disclosure is related to the field of transient electromagnetic field measurements made in a geological formation. Specifically, the disclosure increases an azimuthal sensitivity and resolution of the transient field to formation boundaries.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 to Beard et al. The instrument described in the Beard patent includes a transmitter antenna and a plurality of receiver antennas positioned at axially spaced apart locations along the instrument housing. An alternating current is passed through the transmitter antenna. Voltages which are induced in the receiver antennas as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

At the ultra-deep scale, technology may be employed based on transient field behavior. The transient electromagnetic (TEM) field method is widely used in surface geophysics. Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter. This transient field is especially important for logging.

Rapidly emerging measurement-while-drilling (MWD) technology introduces a new, meso-deep (3-10 meters) scale for an electromagnetic logging application related to well navigation in thick reservoirs. A major problem associated with the MWD environment is the introduction of a metal drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver. The sensitivity of such a tool to remote boundaries is low.

Currently, induction tools operate to obtain measurements either in the presence of a primary field or by using transient field techniques. Examples of current techniques for obtaining measurements using either primary field or transient field phenomena in measurement-while-drilling methods include the Multiple Propagation Resistivity (MPR) device, and the High-Definition Induction Logging (HDIL) device. In these techniques, one or more transmitters disposed along a drill tool act as a primary source of induction, and signals are received from the formation at receiver antennas placed at an axial distance from the transmitters along the drill tool. One disadvantage of both MPR and HDIL methods is that the primary source of induction from the transmitter is always present during the time frame in which the receivers are obtaining measurements from the formation, thereby distorting the intended signal. This can be solved by using pulse excitations such as is done in a transient induction tool.

In a typical transient induction tool, current in the transmitter antenna drops from its initial value $I_0$ to 0 at the moment t=0. Subsequent measurements are taken while the rotating tool is moving along the borehole trajectory. The currents induced in the drilling pipe and in the formation (i.e. eddy currents) begin diffusing from the region close to the transmitter antenna in all the directions surrounding the transmitter. These currents induce electromagnetic field components which can be measured by induction antennas placed along the conductive pipe. Signal contributions due to the eddy currents in the pipe are considered to be parasitic, since the signal due to these currents is much stronger than the signal from the formation. In order to receive a signal which is substantially unaffected by the eddy currents in the pipe, one can measure the signal at the very late stage, at a time in which the signals from the formation dominate parasitic signals due to the pipe. Although the formation signal dominates at the late stage, it is also very small, and reliable measurement can be difficult. In prior methods, increasing the distance between transmitter and receivers reduces the influence of the pipe and shifts dominant contribution of the formation to the earlier time range. Besides having limited resolution with respect to an oil/water boundary, such a system is very long (up to 10-15 m) which is not desirable and convenient for an MWD tool.

A number of publications describe different applications of a MPR resistivity logging measurements. See, for example, Meyer, W., 1997, Multi-parameter propagation resistivity interpretation, 38$^{th}$ SPWLA annual transactions, paper GG). All these publications describe dual pairs of transmitting antennas that permit long- and short-spaced measurements of phase difference and attenuation resistivities at the frequencies of 2 MHz and 400 MHz. The resulting resistivity curves support detailed quantitative and petrophysical analysis.

One of the problems in making EM measurements while drilling is the presence of the drillstring. The drillstring has a finite, nonzero conductivity, and influences the measurements differently than a nonconducting mandrel (used in wireline applications), or a drillstring of infinite conductivity. U.S. Pat. No. 6,906,521 to Tabarovsky having the same assignee as the present disclosure discusses a method of obtaining a parameter of interest, such as resistivity, of an earth formation using a tool having a body with finite, non-zero conductivity. The method obtains a signal from the earth formation that is substantially independent of the conductivity of the tool. A first signal is produced using a transmitter on the tool. An axially separated receiver receives a second signal that results from an interaction of the first signal with the earth formation. The second signal is dependent on the conductivity of the induction tool. This second signal can be represented using a Taylor series expansion in one half of odd integer powers of time. At least one leading term of the Taylor series expansion can be subtracted from the second signal. By suitable processing of the signals, Tabarovsky teaches the determination of the formation resistivity. The examples given in Tabarovsky use z-oriented transmitter and receiver antennas.

U.S. Pat. No. 7,167,006 of Itskovich discloses a method in which transient electromagnetic measurements are made to determine a formation resistivity property including a distance to an interface in the earth formation. The method disclosed therein subtracts a reference calibration from the measured signal to correct for the conductivity of the tool. The reference signal may be obtained in a homogenous medium. The present method addresses the problem without the necessity of obtaining a reference signal in a homogenous medium, but uses a measurement made in normal operations.

SUMMARY OF THE DISCLOSURE

One embodiment of the disclosure is an apparatus configured to estimate a value of a resistivity property of an earth formation. The apparatus includes: a tool configured to be conveyed in a borehole; at least one transmitter and at least one receiver on the tool, the at least one transmitter and at least one receiver defining two transmitter-receiver combinations, the at least one transmitter configured to induce a current in the earth formation, the at least one receiver configured to produce a transient signal responsive to the induced current, the transient signal being responsive to a conductive body of the tool; and at least one processor configured to estimate the value of the resistivity property using a first transient signal corresponding to a first one of the two transmitter-receiver combinations and a second transient signal corresponding to a second one of the two transmitter-receiver combinations, the estimate being substantially unaffected by the conductive body of the tool.

Another embodiment is a method of estimating a value of a resistivity property of an earth formation. The method includes: conveying a tool in a borehole; using at least one transmitter and at least one receiver on the tool to define two transmitter-receiver combinations, using the at least one transmitter to induce a current in the earth formation, using the at least one receiver configured to produce a transient signal responsive to the induced current, the transient signal being responsive to a conductive body of the tool; and estimating the value of the resistivity property using a first transient signal corresponding to a first one of the two transmitter-receiver combinations and a second transient signal corresponding to a second one of the two transmitter-receiver combinations, the estimate being substantially unaffected by the conductive body of the tool.

Another embodiment of the disclosure is a computer-readable medium accessible to at least one processor. The computer-readable medium includes instructions which enable the at least one processor to: estimate a value of a resistivity property of an earth formation using a first transient signal and a second transient signal produced by at least one receiver on a logging tool responsive to activation of a transmitter on the logging tool, the first transient signal and the second transient signal being affected by a conductive body of the tool, the estimate being substantially unaffected by the conductive body of the tool.

BRIEF DESCRIPTION OF THE DRAWINGS

The present disclosure is best understood with reference to the accompanying drawings in which like numerals refer to like elements and in which.

DETAILED DESCRIPTION OF THE DISCLOSURE

Figure 1:
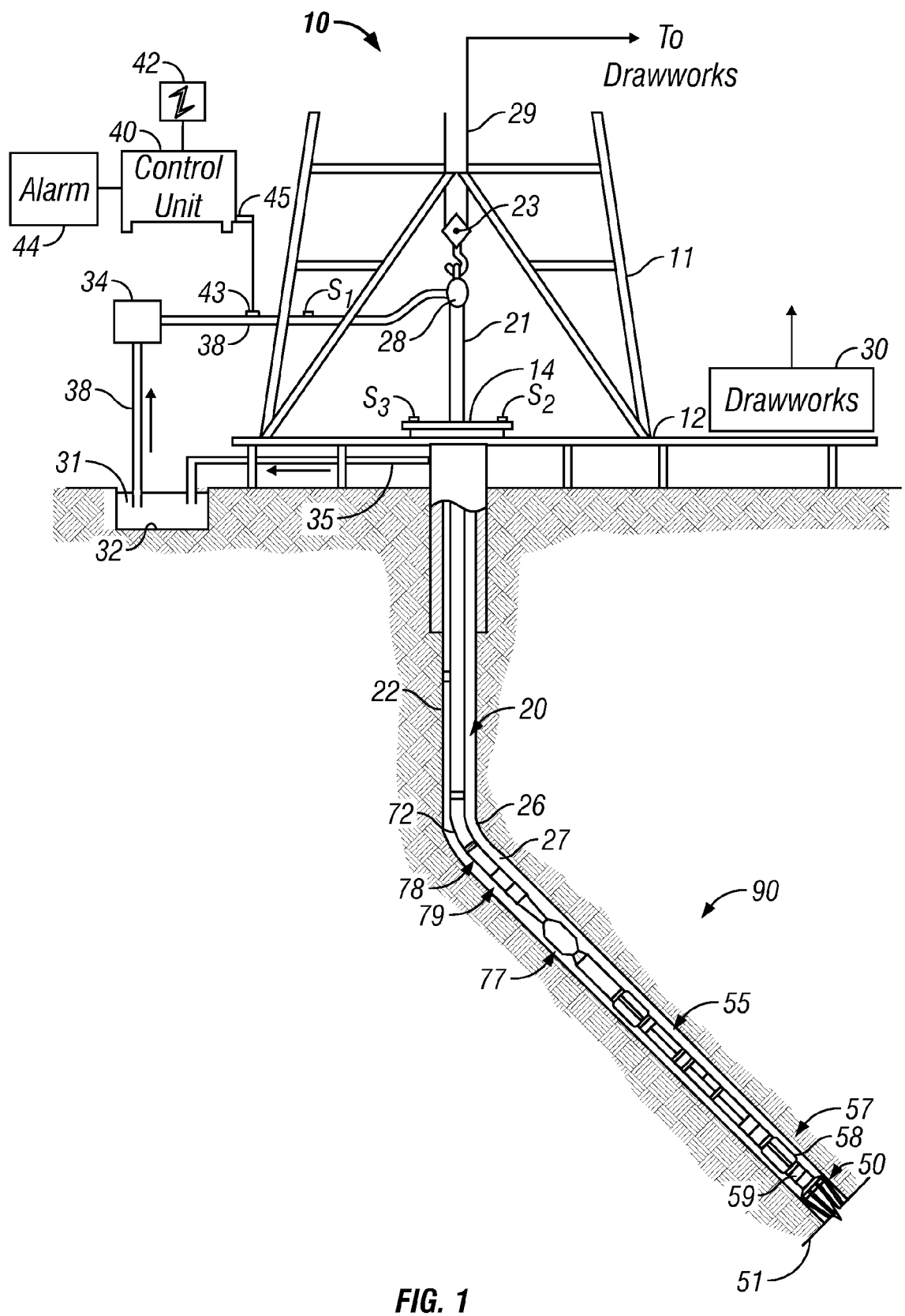
FIG. 1 shows a measurement-while-drilling tool suitable for use with the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
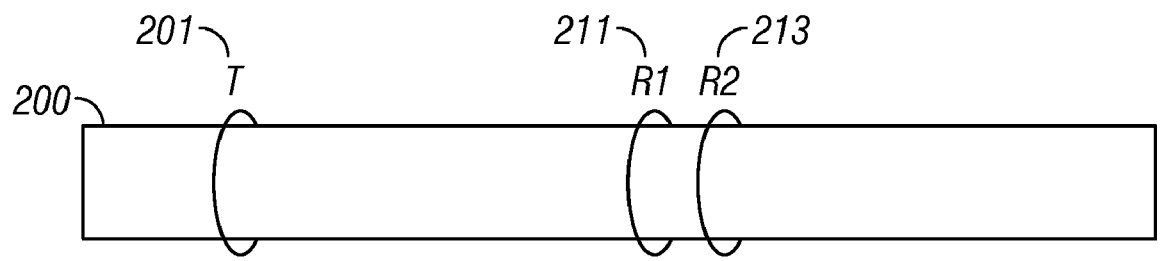
FIG. 2 shows a propagation resistivity measuring device having one transmitter and two receivers.

FIG. 2 shows an exemplary MWD propagation resistivity instrument. A transmitter antenna 201 and receiver antennas 211, 213 assembly are positioned along a portion 200 of drill pipe. The portion of the drill pipe may be provided with ferrite coating or with cuts for suppressing eddy currents. See U.S. Pat. Nos. 7,150,316 and 7,046,009 to Itskovich having the same assignee as the present disclosure. The two receiver antennas measure the magnetic fields, $H_1$ and $H_2$, or equivalently, the voltages $V_1$ and $V_2$. Because all the antennas are mounted on a metal drill pipe, the measurements are inevitably influenced by the pipe. However, the pipe effect should be suppressed in order to measure the formation response, particularly for deep investigation. Both numerical simulation and field data have shown that the pipe effect can be substantially suppressed by measuring the ratio between the two measurements $$D = \frac{H_2}{H_1}. \tag{1}$$

From the ratio are defined both the attenuation and phase difference $$ATT = -20\log|D|, \tag{2}$$

$$PHA = \tan^{-1}\left(\frac{\Im(D)}{\Re(D)}\right), \tag{3}$$

where $\Re(.)$ and $\Im(.)$ represent the real and imaginary parts. When the receivers are approximately 1 m or farther from the transmitter, both the attenuation and phase difference can be accurately represented by those without a drill pipe.

Based on the frequency-domain measurement method, a similar method is used for the time-domain measurement. We assume that a transmitter antenna carries a constant current that is shut off at t=0. We place two receiver antennas on one side of the transmitter antenna to measure the time responses of the surrounding medium including the pipe. Let the two measurements be $h_1(t)$ and $h_2(t)$. We define a new quantity $$h(t) = h_1(t) \otimes h_2^{-1}(t), \tag{4}$$

where $h_2^{-1}(t)$ is the inverse of $h_2(t)$, and $\otimes$ represents a convolution operation. It can be easily shown that equation (4) is equivalent to equation (1). Using the argument that the ratio in equation (1) removes much of the pipe effect, the new measurement defined by equation (4) will also largely suppress the pipe effect.

As Itskovich showed, placing a layer of ferrite between the antenna wires and the pipe surface will reduce the induced current in the pipe and thus reduce the interference of the pipe with the formation signal measurement. This is referred to as a damping portion on the tubular. This method can be combined with equation (4) to further improve the pipe effect suppression.

Figure 3:
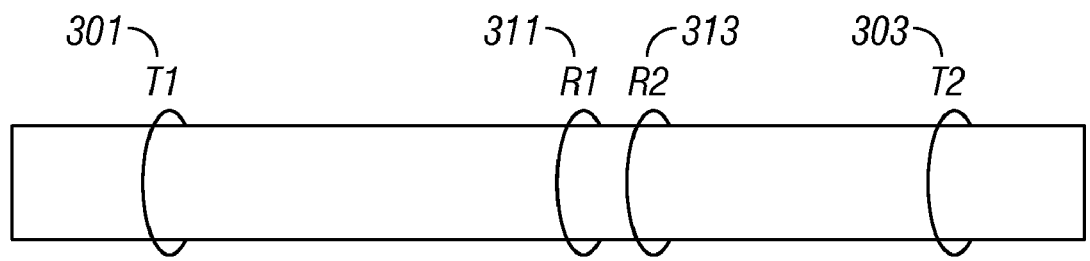
FIG. 3 shows a propagation resistivity device having two transmitters and two receivers.

Like the conventional LWD resistivity tools, symmetric arrays can be used (FIG. 3). Measurements are taken with each transmitter 301, 303 turned on sequentially. Deconvolution is applied to the data acquired for each transmitter separately 311, 313. The deconvolved results from the two transmitters are then convolved to give the final tool response. The compensation provided by dual, symmetric transmitters is illustrated as follows.

Let $H(\omega)$ be the magnetic field to be recorded by a receiver antenna. Due to temperature drift, antenna deformation, or other environmental and electronic errors, the recorded field can be written as $$H^*(\omega) = A(\omega)e^{i\Delta\phi}H(\omega), \tag{5}$$

where $A(\omega)$ is the amplitude distortion factor and $\Delta\phi$ is the phase distortion. For a two-transmitter and two-receiver array, the individual measurements can be written as $$H^*_{T1R1}(\omega) = A_{R1}(\omega)e^{i\Delta\phi_{R1}}H_{T1R1}(\omega), \tag{6}$$

$$H^*_{T1R2}(\omega) = A_{R2}(\omega)e^{i\Delta\phi_{R2}}H_{T1R2}(\omega), \tag{7}$$

$$H^*_{T2R1}(\omega) = A_{R1}(\omega) e^{i\Delta\phi_{R1}} H_{T2R1}(\omega) \quad (8),$$

and $$H^*_{T2R2}(\omega) = A_{R2}(\omega) e^{i\Delta\phi_{R2}} H_{T2R2}(\omega) \quad (9),$$

In the above, we have assumed that the measurement errors are induced by the receivers (antennas and corresponding circuits) and independent of transmitters.

By taking the ratio of the far-receiver measurement over the near-receiver measurement, the response for each transmitter is given by $$H^*_{T1}(\omega) = \frac{H^*_{T1R2}(\omega)}{H^*_{T1R1}(\omega)} \quad (10)$$

$$= \frac{A_{R2}(\omega)}{A_{R1}(\omega)} e^{[i(\Delta\phi_{R2} - \Delta\phi_{R1})]} \frac{H_{T1R2}(\omega)}{H_{T1R1}(\omega)},$$

and $$H^*_{T2}(\omega) = \frac{H^*_{T2R1}(\omega)}{H^*_{T2R2}(\omega)} \quad (11)$$

$$= \frac{A_{R1}(\omega)}{A_{R2}(\omega)} e^{[i(\Delta\phi_{R1} - \Delta\phi_{R2})]} \frac{H_{T2R1}(\omega)}{H_{T2R2}(\omega)}.$$

Taking a geometrical average of the two responses yields $$H^*(\omega) = [H^*_{T1}(\omega) H^*_{T2}(\omega)]^{1/2} = [H_{T1}(\omega) H_{T2}(\omega)]^{1/2} \quad (12).$$

In other words, the errors induced by the two individual receivers are removed in the final response by taking a geometrical average of the two responses for the symmetric transmitters.

In the time domain, equation (12) converts to $$h^*(t) = h^*_{T1}(t) * h^*_{T2}(t) = h_{T1}(t) * h_{T2}(t). \quad (13)$$

Hence, by taking convolution of the transient responses for two symmetric transmitters, the errors induced by the receivers can be removed. The response for each transmitter is given by equation (4).

Figure 4:
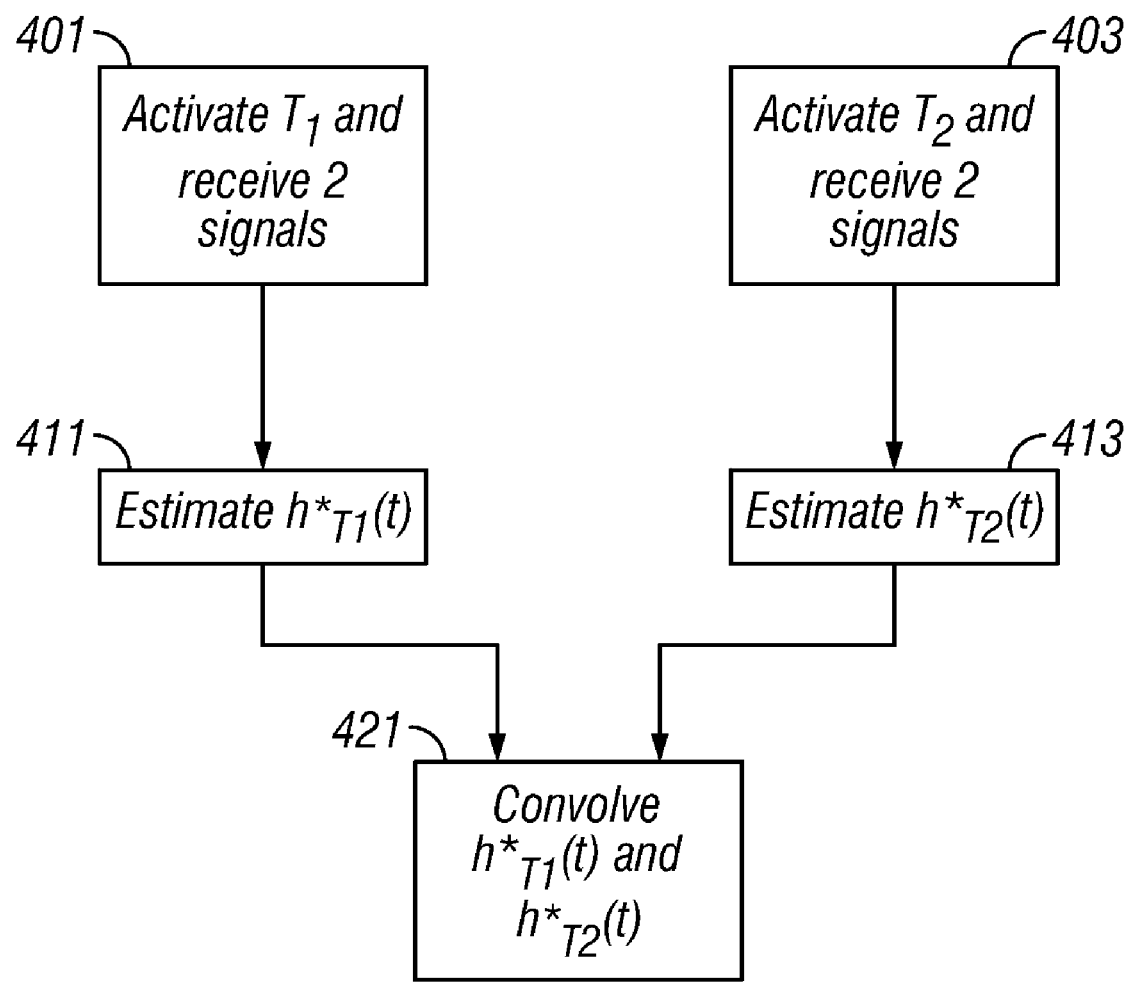
FIG. 4 shows a flow chart of some of the steps of the disclosed method.

FIG. 4 illustrates a flow chart of the method of the present disclosure. Transmitter $T_1$ is activated and measurements are made at the two receivers 401. Transmitter $T_2$ is activated and measurements are made at the two receivers 403. The measurements corresponding to 401 are deconvolved 411 using equation (4) to give $h^*_{T1}(t)$. This may be referred to as an estimate of a resistivity property of the earth formation. The measurements corresponding to 403 are deconvolved 413 using equation (4) to give $h^*_{T2}(t)$. $h^*_{T1}(t)$ and $h^*_{T2}(t)$ are then convolved 421. This may be referred to as an additional estimate of the resistivity property. The square root is taken to give an improved estimate of the formation response.

Those versed in the art and having benefit of the present disclosure would recognize from the principle of reciprocity that an equivalent method could be used with two receivers symmetrically disposed about two transmitters. By following an equivalent procedure, compensation can be made for any relative drift between the two receivers. Specifically, for each of the receivers, deconvolution of the two transmitter signals is done.

A particular application of either of the embodiments of the disclosure described above is in reservoir navigation. An example of the use of resistivity is given in U.S. Pat. No. RE35,386 to Wu et al., having the same assignee as the present application and the contents of which are fully incorporated herein by reference. Disclosed in Wu is a method for detecting and sensing boundaries between strata in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity measurements made in Wu are made with a conventional electromagnetic (EM) propagation resistivity instrument. The measurements made with a propagation EM tool lack directional information. Another example of reservoir navigation using multicomponent measurements is described in copending U.S. patent application Ser. No. 10/373,365 of Merchant et al., having the same assignee as the present disclosure and the contents of which are fully incorporated herein by reference. The principles described in Wu or Merchant can be used with transient measurements (as described above) for maintaining the drillstring at a desired distance from an interface, such as a gas-oil contact or an oil-water contact.

Implicit in the control and processing of the data is the use of a computer program on a suitable machine readable medium that enables the processor to perform the control and processing. The machine readable medium may include ROMs, EPROMs, EPROMs, Flash Memories and Optical disks.

The method and apparatus of the present disclosure has been described above with reference to a MWD embodiment. This is not to be construed as a limitation as the disclosure can also be practiced with the apparatus conveyed on a wireline.

What is claimed is:

1. An apparatus configured to estimate a value of a resistivity property of an earth formation, the apparatus comprising:
   a tool configured to be conveyed in a borehole;
   at least one transmitter and at least one receiver on the tool, the at least one transmitter and at least one receiver defining two transmitter-receiver combinations, the at least one transmitter configured to induce a current in the earth formation, the at least one receiver configured to produce a transient signal responsive to the induced current, the transient signal being responsive to a conductive body of the tool; and
   at least one processor configured to estimate the value of the resistivity property deconvolving a first transient signal corresponding to a first one of the two transmitter-receiver combinations using a second transient signal corresponding to a second one of the two transmitter-receiver combinations, the estimate being substantially unaffected by the conductive body of the tool.

2. The apparatus of claim 1 wherein the at least two transmitter-receiver combinations are selected from: (i) a single transmitter and two receivers, and (ii) a single receiver and two transmitters.

3. The apparatus of claim 1 wherein the processor is further configured to use the estimated value of the resistivity to estimate a distance to an interface in the earth formation.

4. The apparatus of claim 1 wherein the at least two transmitter-receiver combinations further comprises an additional two transmitter-receiver combinations and the at least one processor is further configured to make an additional estimate of the resistivity property by using an additional first transient signal and an additional second transient signal corresponding to the additional two transmitter-receiver combinations.

5. The apparatus of claim 1 further comprising a bottomhole assembly on a drilling tubular configured to convey the tool into the borehole; and wherein the at least one processor is further configured to control a drilling parameter of the BHA using the determined distance.

6. The apparatus of claim 1 further comprising a damping portion on the conductive body configured to suppress eddy currents in the conductive body.

7. A method of estimating a value of a resistivity property of an earth formation, the method comprising:
conveying a tool in a borehole;
using at least one transmitter and at least one receiver on the tool to define two transmitter-receiver combinations,
using the at least one transmitter to induce a current in the earth formation,
using the at least one receiver configured to produce a transient signal responsive to the induced current, the transient signal being responsive to a conductive body of the tool; and
estimating the value of the resistivity property deconvolving a first transient signal corresponding to a first one of the two transmitter-receiver combinations using a second transient signal corresponding to a second one of the two transmitter-receiver combinations, the estimate being substantially unaffected by the conductive body of the tool.

8. The method of claim 7 further comprising defining the at least two transmitter-receiver combinations from: (i) a single transmitter and two receivers, and (ii) a single receiver and two transmitters.

9. The method of claim 8 further comprising using the estimated value of the resistivity to estimate a distance to an interface in the earth formation.

10. The method of claim 7 further comprising:
(i) defining the at least two transmitter-receiver combinations with an additional two transmitter-receiver combinations and;
(ii) making an additional estimate of the resistivity property by using an additional first transient signal and an additional second transient signal corresponding to the additional two transmitter-receiver combinations.

11. The method of claim 7 further comprising:
(i) using a bottomhole assembly on a drilling tubular to convey the tool into the borehole; and
(ii) controlling a drilling parameter of the BHA using the determined distance.

12. The method of claim 7 further comprising providing a damping portion on the conductive body configured to suppress eddy currents in the conductive body.

13. A non-transitory computer-readable medium product having thereon instructions that when read by at least one processor, cause the at least one processor to execute a method, the method comprising:
estimating a value of a resistivity property of an earth formation by deconvolving a first transient signal using a second transient signal produced by at least one receiver on a logging tool responsive to activation of a transmitter on the logging tool, the first transient signal and the second transient signal being affected by a conductive body of the tool, the estimate being substantially unaffected by the conductive body of the tool.

14. The computer-readable medium of claim 13 further comprising at least one of: (i) a ROM, (ii) an EPROM, (iii) an EPROM, (iv) flash memory, or (v) an optical disk.

* * * * *